March 5, 1929.  W. J. PEELLE  1,704,405
JAR CAPPING MACHINE
Filed Aug. 18, 1923  5 Sheets-Sheet 1

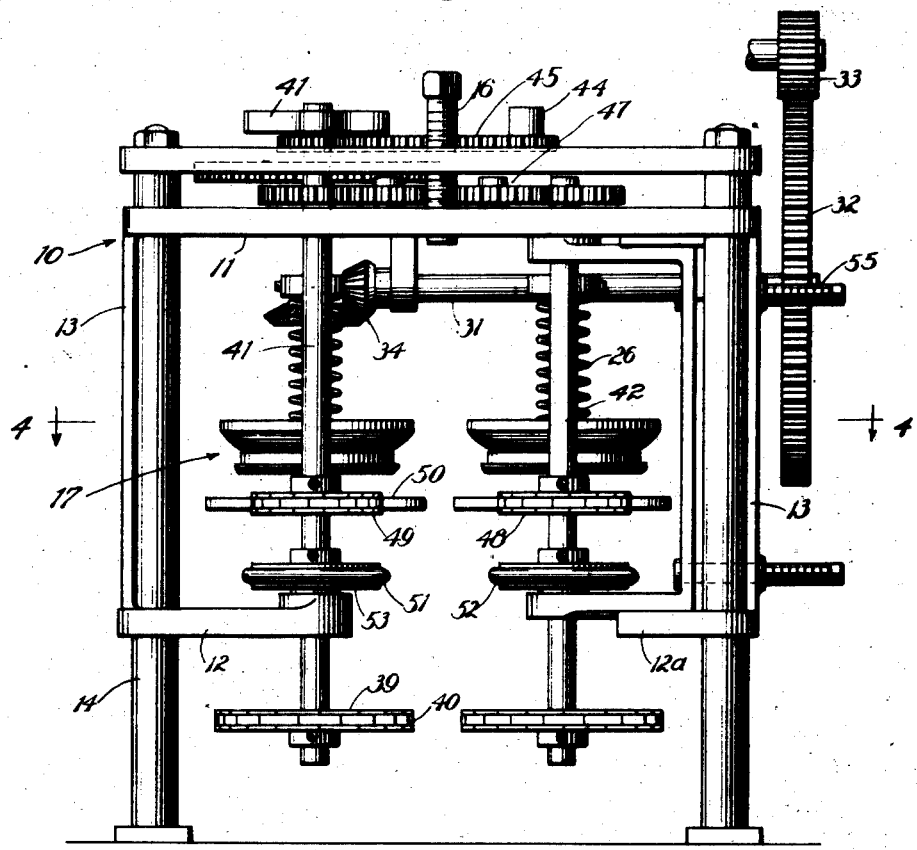
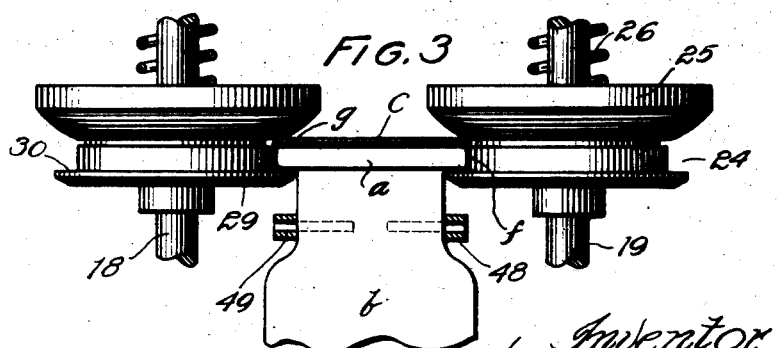

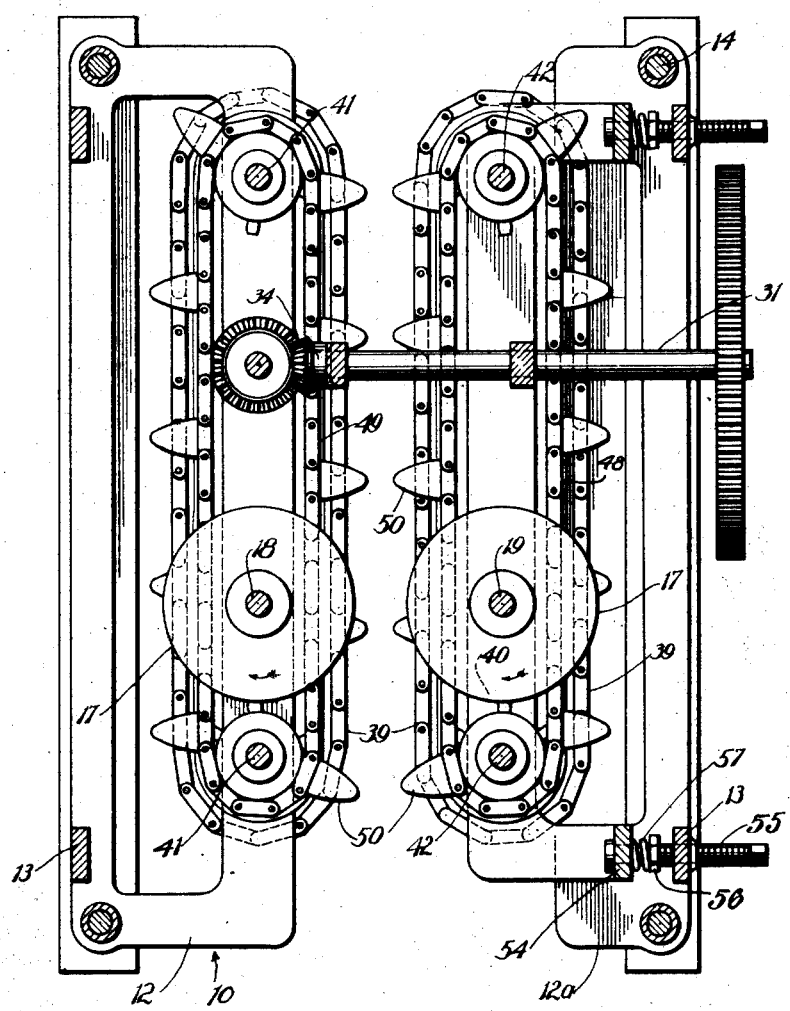

March 5, 1929.  W. J. PEELLE  1,704,405
JAR CAPPING MACHINE
Filed Aug. 18, 1923   5 Sheets-Sheet 4

Inventor
Willis J. Peelle

March 5, 1929.  W. J. PEELLE  1,704,405
JAR CAPPING MACHINE
Filed Aug. 18, 1923  5 Sheets-Sheet 5

Inventor
Willis J. Peelle

Patented Mar. 5, 1929.

1,704,405

UNITED STATES PATENT OFFICE.

WILLIS J. PEELLE, OF CHICAGO, ILLINOIS.

JAR-CAPPING MACHINE.

Application filed August 18, 1923. Serial No. 658,092.

The invention pertains to machines for capping glass bottles, jars and similar containers and the aim of the invention is to produce a machine operating automatically to accomplish the capping operation effectually and with a substantially high degree of rapidity.

With this aim in view, the invention has for a primary object the provision of a machine in which the jars or other containers to be capped are moved successively into operative association with a capping means whereby caps are simultaneously forced onto the mouth of the jar or other container and formed over and around a lip or flange upon the container so as to be held securely in position thereon.

Another object is to provide a capping means adapted operatively to engage a cap upon a container, upon diametrically opposite sides thereof, and impart a rotary motion thereto during which the cap is caused to interlock with the mouth of the container.

A further object of the invention is to provide means for presenting the containers to the capping means intermittently or with a step-by-step motion, in such a manner that the containers pause in their travel in operative association with the capping means for the short interval required for the capping operation.

Still another object of the invention is to provide a machine which is adjustable to accommodate jars of various sizes.

The objects of the invention thus generally stated, together with other and ancillary advantages may be attained by the construction and arrangement illustrated in the accompanying drawings forming part hereof wherein, Figure 1 is a top plan view of a machine embodying my invention.

Fig. 2 is an end view of the machine.

Fig. 3 is a fragmentary elevational view showing one form of cap-applying means.

Fig. 4 is a horizontal sectional view taken approximately in the plane of line 4—4 of Fig. 2.

The machine to which my invention pertains is essentially adapted to cap and seal containers of the type constructed of fragile material such as glass, and including jars, bottles and the like, but for convenience in the following description and the appended claims I employ the term "jars" in a generic sense to include all containers of this general class.

In carrying out my invention, I provide a suitable conveyor mechanism for moving the jars successively into operative association with a capping means, including means for engaging the caps loosely placed upon the jars and while imparting a rotary motion thereto forming or shaping the metal of the cap into interlocking engagement with a lip or flange upon the mouth of the jar. Preferably the conveyor mechanism operates with a step-by-step or intermittent movement so as to cause the jars to pause momentarily in operative association with the capping means during the aforesaid shaping or forming operation; and the capping means preferably comprises two opposed positively driven forming elements rotating in the same direction so as to cause the jar and cap to rotate during such pause in their movement, on a substantially fixed axis. In some instances, if desired, only one of such rotary forming elements may be employed, it being apparent that where two elements are employed one of them in a broad sense constitutes simply an abutment against which the mouth of the jar and cap thereon bear at one side when pressure is applied to the diametrically opposite side by the other one of said elements in forming or shaping the cap to effect the desired interlocking result.

In the machine selected for purposes of illustration, the forming means and the associated operating mechanism are carried by a frame mounted for vertical adjustment upon a suitable stationary support. The conveyor mechanism for the jars may be supported in any suitable or preferred manner. In the present instance I have shown the conveyor mechanism as being also carried by the vertically adjustable frame.

Figure 5:
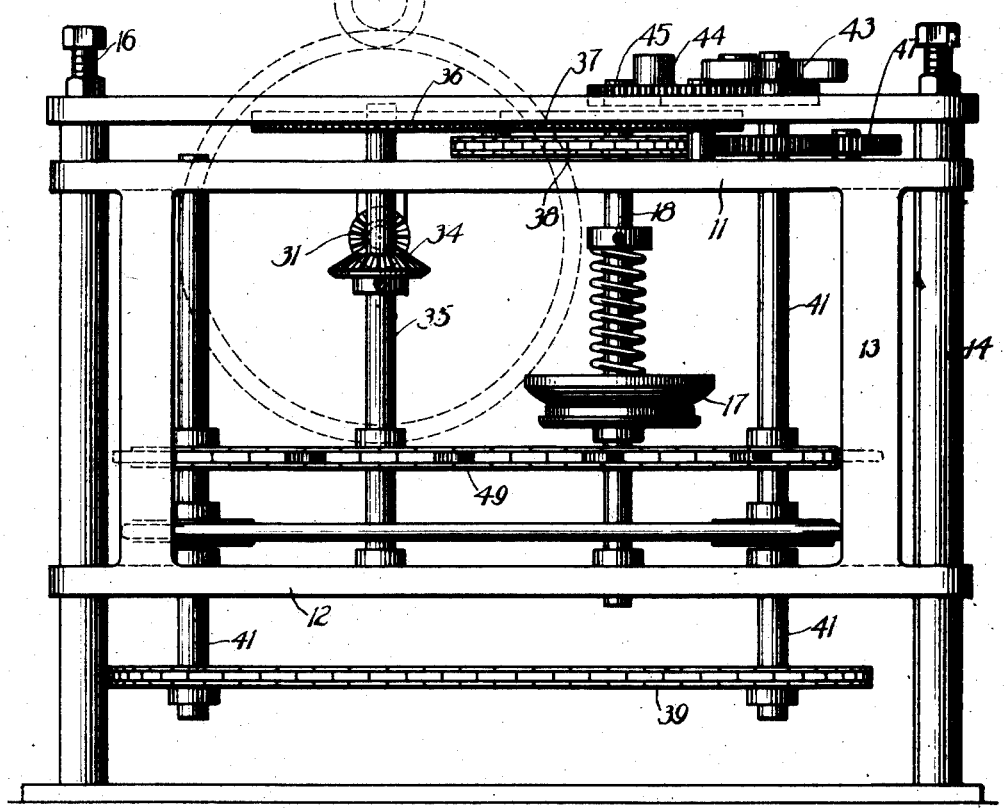
Fig. 5 is a side elevational view of the machine, the cap-applying means being in the form shown in Fig. 3.
Figure 7:
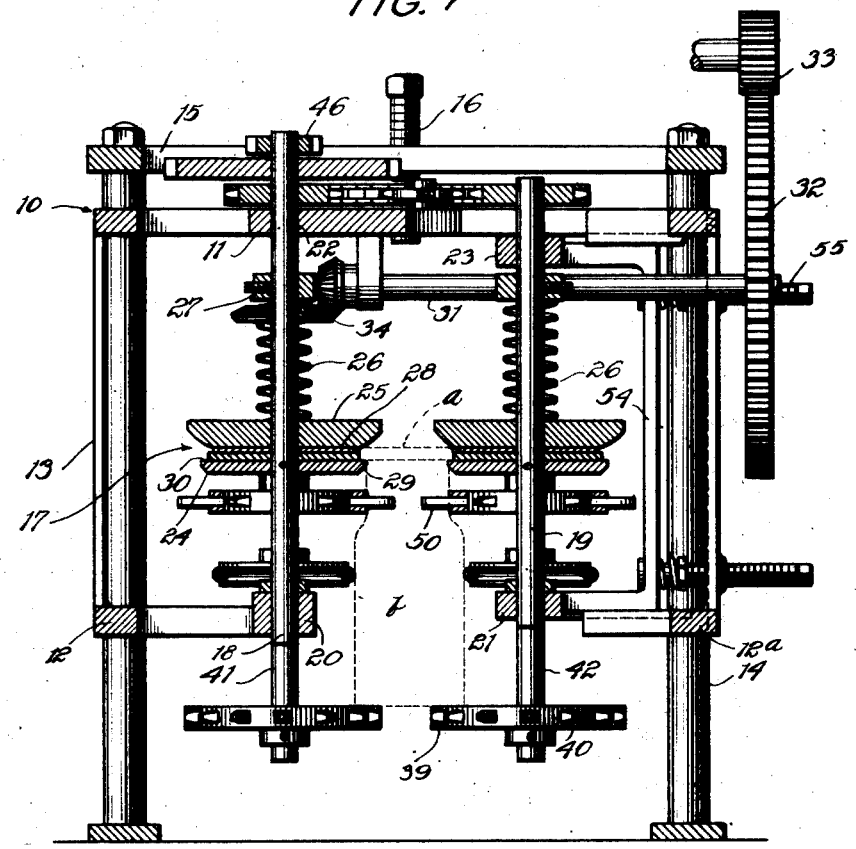
Fig. 7 is a vertical sectional view taken approximately in the plane of line 7—7 of Fig. 1.

Said supporting frame is indicated generally by the numeral 10, and comprises in the present instance a top member 11 and bottom members 12 and 12ª, the latter being connected to the top member by side bars 13 (Figs. 5 and 7). The top and bottom members are mounted for up and down adjustment upon four upright corner posts 14 of the main stationary support, the upper ends of said posts being rigidly connected by a rectangular frame 15. Vertical adjustment of the frame 10 upon the posts 14 is effected by means of adjusting screws 16 provided at opposite ends of the machine (Fig. 5).

The capping means which I preferably employ comprises a pair of rotary forming elements designated generally by the numeral 17. These elements are mounted on vertical shafts 18 and 19 arranged in laterally spaced relation approximately centrally of the machine. At their lower ends said shafts are mounted in bearing members 20 and 21 carried by the bottom members 12 and 12ª of the frame 10, and at their upper ends said shafts are journaled in bearings 22 and 23 carried by the top member 11 of said frame.

The elements 17 are preferably made in two sections. Thus each comprises a lower section or disk 24 fast upon its shaft and an upper section or disk 25 which may be loose upon the shaft but which is forced downwardly into engagement with the section 24 by means of a coiled expansion spring 26 bearing between the upper section and a collar 27 adjustably mounted upon the shaft. If desired, a spacing disk 28 may be inserted between the two sections of the element. The lower disk 24 has its periphery shaped in accordance with the construction of the periphery of the jar at its mouth, various constructions being shown in Figs. 3, 6 and 8. Thus in the form shown in Fig. 3, the disk section 24 has a single annular rib 29 the upper side of which forms an annular shoulder 30. This rib 29 is adapted to engage with the depending flange $f$ of a cap $c$ placed upon a jar $b$ at a point just below the annular flange or lip $a$ of the jar whereby to force the lower edge of the flange $f$ inwardly, turning it under the lip $a$ so as to form a shoulder engaging with a shoulder formed by the underside of the lip $a$, to interlock the cap upon the jar.

The upper disk 25 of the rotary element 17 serves in the foregoing operation to force the cap downwardly upon the mouth of the jar, the cap being provided with a suitable gasket $g$. Obviously the amount of pressure thus exerted by the upper section or disk 25 upon the cap may be varied at will by adjusting the tension of the spring 26 through the medium of the collar 27; and preferably the periphery of the disk 25 is beveled so as to increase the effectiveness of the forming operation by rounding the upper corner of the cap into snug contact with the upper outer edge of the jar mouth.

Figure 6:
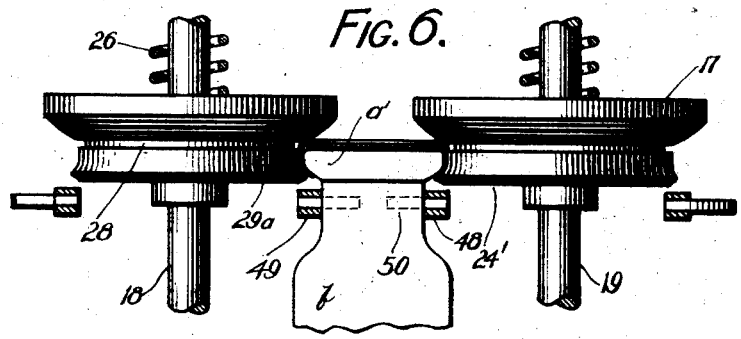
Fig. 6 is a view similar to Fig. 3 but showing still another form of cap-applying means.
Figure 8:
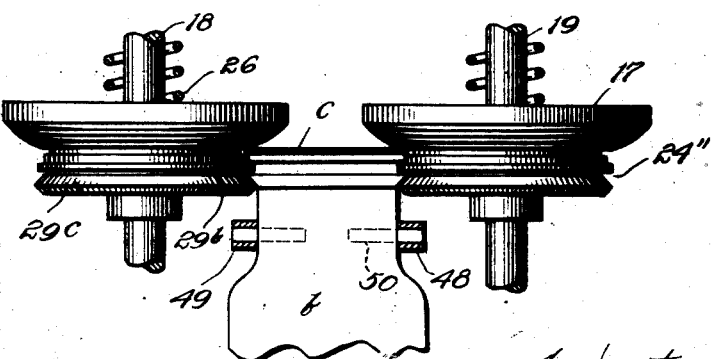
Fig. 8 is a horizontal enlarged detail view showing a somewhat different form of means for applying the caps to the jars.

In Fig. 6, the lower disk 24' of each of the rotary forming elements is shown as provided with a somewhat differently shaped forming rib 29ª to coact with a jar having a differently shaped retaining lip $a'$, the lower edge of the lip being rounded instead of sharpened; and in Fig. 8 the lower disk 24'' of the rotary element is provided with a pair of forming ribs 29ᵇ and 29ᶜ, the former being adapted to shape the cap to form an inturned annular bead intermediate the upper and lower edges of the cap flange, and the latter being adapted to form an inturned flange somewhat similar to that formed in the rib 29ª in Fig. 6. Obviously other methods of forming the caps to correspond with other type of jars may be employed when desired.

Figure 1:
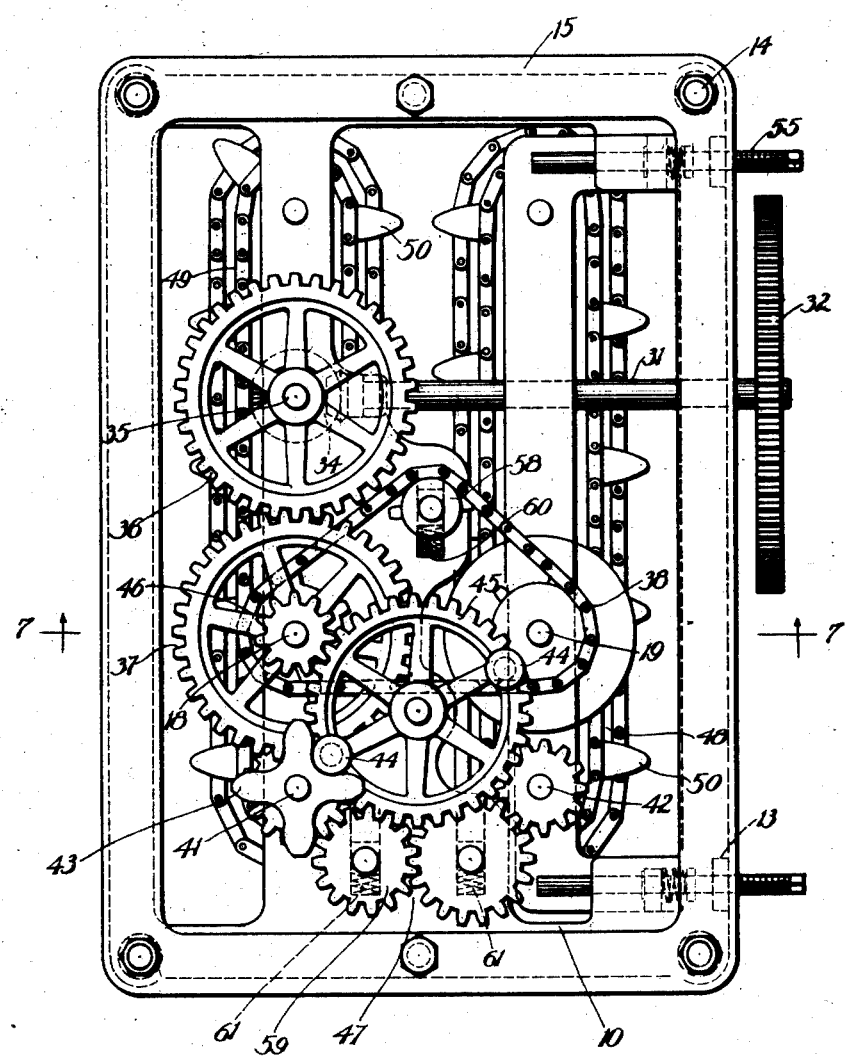

The forming operation is accomplished upon a movement of a jar with a cap thereon into a position between the two rotary elements 17. In performing this operation, both of the said elements are in the present instance rotated positively and in the same direction so as to impart rotary movement to the jar and the cap thereon. The means for thus positively rotating the element 17 may be of any suitable or preferred character. That herein shown comprises (Figs. 1, 5 and 7) a drive shaft 31 horizontally disposed near the upper portion of the machine and journaled in suitable bearings provided by the frame 10. This shaft is arranged to be connected with a source of power by a spur gear 32 and pinion 33; and the shaft is connected by bevel gearing 34 with a vertically disposed shaft 35 (Fig 5) also mounted in the frame 10. The shaft 18 is connected with the upper end of the shaft 35 by a pair of intermeshing gears 36 and 37 (Figs. 1 and 5) and the upper end of the shaft 19 is connected with the shaft 18 by a chain and sprocket mechanism designated generally by the numeral 38 so that the shaft 19 rotates in the same direction as the shaft 18 causing the jar and its cap to rotate on an approximately fixed axis between the two rotary elements during the forming operation.

The means for positioning the jars relative to the rotary forming elements comprises an endless conveyor mechanism upon which the jars are supported for movement longitudinally through the machine, and also means for controlling such movement including one or more feed chains. Referring to Figs. 5 and 7, the endless conveyors for supporting the jars $b$ herein comprise a pair of sprocket chains 39 operating over wheels 40 carried at the lower ends of two pairs of shafts 41 and 42. One of said shafts 41 is extended upwardly (Fig. 5) and has fast thereon at its extreme upper end a Geneva gear 43 which is adapted to be engaged by a pair of diametrically disposed rollers 44 mounted upon a spur gear 45 suitably journaled upon the frame 10. Said gear 45 in turn meshes with a pinion 46 upon the extreme upper end of the shaft 18; and movement is imparted from the shaft 41 to the opposite shaft 42 of the pair by a gear train designated generally by the numeral 47. The shafts of the other pair at the opposite end of the machine are connected to operate in unison through the medium of chain and sprocket mechanisms designated generally by the numerals 48 and 49, as well as by the conveyor chains 39, and sprockets 40.

The chains of the mechanisms 48 and 49 are also utilized to space the jars the proper distance apart, and to insure their positive movement into position between the rotary elements 17. To this end, said chains have rigid therewith fingers 50 (Fig. 4) which operate in pairs to engage the jars and hold them against sliding movement upon their supports 39. If desired, an additional means may be employed for guiding the jars in their movement through the machine, which means may consist of a pair of belts 51 and 52 of leather or other relatively soft material operating upon pulley wheels 53 mounted upon the respective shafts 41 and 42.

In order to permit of relative lateral adjustment between the two rotary elements 17, the shaft 19 carrying one of said elements, and also the shafts 42 carrying the chain and sprocket mechanisms 39—40, are mounted upon an adjustable bracket 54 forming part of the frame 10, and adjustable between the top member 11 thereof and the bottom member 12ª (Figs. 4 and 7). The means which I employ for effecting this adjustment when desired comprises a plurality of screws 55 having a threaded engagement with the frame 10 and slidably connected with the auxiliary bracket or frame 54. Each of said screws 55 may have a nut 56 thereon between which and the bracket is interposed a spring 57 whereby the latter is capable of yielding outwardly should the rotary element carried by the shaft 19 be subjected to strain due to any irregularity in the formation of the jar, thus avoiding injury to the latter. To permit of this lateral adjustment of the shafts 19 and 42 without disturbing their connections with the shafts 18 and 41 respectively, the chain and sprocket mechanism 38 (Fig. 1) and the gear train 47 include idlers 58 and 59 which are mounted in the top member of the frame 10 for yielding movement as permitted by springs 60 and 61.

Summarizing the operation of the machine, power applied to the shaft 31 is transmitted to the shaft 35 through the bevel gearing 34 (Figs. 1 and 5), and thence is transmitted to the shaft 18 through the gears 36 and 37. The shaft 19 is simultaneously rotated in the same direction as the shaft 18 by the chain and sprocket mechanism 38. Rotary movement is thus imparted to both of the rotary forming elements 17 causing them to operate in the same direction.

Jars $b$ are fed intermittently into operative association with the elements 17 by the chains 39 which serve to support the jars, and by the chain and sprocket mechanisms 48 and 49 carrying the fingers 50 which positively move the jars in properly spaced relation. Movement is imparted to such conveying means through the gear 45 and rollers 44, the latter engaging the Geneva gear 43 which is fast on one of the shafts 41 and thereby, through the gear train 47 drives the corresponding shaft 42 while the shafts 41 and 42 at the opposite end of the machine are driven by the chain and sprocket mechanisms 48 and 49. It will be observed that in such movement of the jars there is an entire absence of friction between them and their supporting and guiding means.

The arrangement of the conveyor mechanism is such that the jars, as they pass between the rotary elements, pause momentarily while rotary movement is imparted thereto through the operation of the elements 17. These latter engage with the caps previously placed upon the jars, upon diametrically opposite sides thereof, and since the elements rotate in the same direction, each jar with its cap rotates upon an approximately fixed axis during the forming operation. In this operation the upper section or disk 25 of the forming means exerts pressure upon the cap to effect the desired seal while the lower or forming section of the elements acts to interlock the cap with the retaining lip or flange on the jar; and the operation is performed in the short interval of time allowed by the intermittent feeding movement imparted to the jars. The length of time thus allowed for the forming operation is of substantial importance for the reason that if the time is too short, the metal will not be rolled smoothly nor make a tight grip, and if the time is too long, the metal will be unduly stretched and thus lose its grip upon the glass. I have found in practice that the rolling operation may best be performed in approximately two revolutions of the jars, so that the speed of the conveyor mechanism and of the rolling or forming elements are preferably correspondingly proportioned.

While I have herein shown and described my invention with considerable particularity, it is contemplated that various changes may be made by those skilled in the art without departing from the spirit and scope of the invention as expressed in the appended claims.

I claim as my invention:

1. In a capping mechanism, parallel shafts, capping disks mounted on said shafts, means for driving one of the shafts from the other to rotate the disks in the same direction, shafts carrying sprocket wheels, sprocket chains mounted on said wheels adapted to move a jar to and between the capping disks, pulleys on said shafts concentric with the sprocket wheels, and a pair of flexible belts arranged on said pulleys parallel with the sprocket chains to hold the jar, substantially as described.

2. In a capping machine, a pair of rotating capping devices by which the cap is applied to a jar, each capping device comprising a plurality of disks adapted to engage the top of the cap, and the flange of the cap respectively, means for yieldingly pressing the disk engaging the top of the cap toward the disk engaging the flange of the cap, the periphery of the latter disk being conformable to the contour of the part of the jar with which the cap is to be engaged, a sub-frame, wherein one capping device is mounted, and means for adjusting the sub-frame so as to move the said capping device thereon to and from the opposed related capping device.

3. In a capping mechanism, parallel shafts, capping disks mounted on said shafts, means for driving one of the shafts from the other to rotate the disks in the same direction, shafts carrying sprocket wheels, and sprocket chains mounted on said wheels adapted to move a jar to and between the capping disks, gearing between the shafts carrying the chains for driving said chains so that their inner runs will move in the same direction, pulleys on said shafts concentric with said sprocket wheels, and a pair of flexible belts arranged on said pulleys parallel with the sprocket chains to hold the jar, substantially as described.

4. In a capping machine, a pair of power driven rotating capping devices by which the cap is applied to a jar, each capping device comprising a plurality of disks rotating about a common center, means for yieldingly pressing the disks together axially, the periphery of the lower disk being conformable to the contour of the part of the jar with which the cap is to be engaged, a frame in which a set of capping devices is mounted, a sub-frame wherein the other set of capping devices is mounted, and means for adjusting the sub-frame so as to move the said capping devices thereon to and from the opposed related capping devices.

In testimony whereof, I have hereunto affixed my signature.

WILLIS J. PEELLE.